United States Patent [19]
Klug et al.

[11] Patent Number: 5,764,499
[45] Date of Patent: Jun. 9, 1998

[54] DIRECT A.C. CONVERTER

[75] Inventors: Rolf-Dieter Klug, Nürnberg; Hans-Peter Timmert, Röttenbach, both of Germany

[73] Assignee: Siemens Aktiengesellschaft, Munich, Germany

[21] Appl. No.: 750,911

[22] PCT Filed: Jun. 28, 1995

[86] PCT No.: PCT/DE95/00835

§ 371 Date: Mar. 27, 1997

§ 102(e) Date: Mar. 27, 1997

[87] PCT Pub. No.: WO96/02085

PCT Pub. Date: Jan. 25, 1996

[30] Foreign Application Priority Data

Jul. 11, 1994 [DE] Germany ............... 44 24 082.1

[51] Int. Cl.⁶ .............. H02M 1/12; H02M 5/27; H02P 21/00
[52] U.S. Cl. .............. 363/39; 363/160; 318/808; 318/812
[58] Field of Search ............... 363/39, 74, 78, 363/157, 159, 160; 323/207; 318/439, 798, 801, 805, 807, 808, 812

[56] References Cited

U.S. PATENT DOCUMENTS

| | | | |
|---|---|---|---|
| 4,468,725 | 8/1984 | Venturini | 363/160 |
| 4,600,874 | 7/1986 | Tupper et al. | 318/798 |
| 4,602,198 | 7/1986 | Weiss et al. | 318/798 |
| 4,602,199 | 7/1986 | Walker | 318/798 |
| 4,607,206 | 8/1986 | Sember et al. | 318/798 |
| 4,713,745 | 12/1987 | Schauder | 363/161 |
| 5,005,115 | 4/1991 | Schauder | 363/159 |
| 5,182,508 | 1/1993 | Schauder | 318/801 |
| 5,351,178 | 9/1994 | Brennen et al. | 363/40 |
| 5,351,181 | 9/1994 | Brennen et al. | 363/71 |
| 5,384,696 | 1/1995 | Moran et al. | 363/40 |
| 5,587,641 | 12/1996 | Rozman | 318/801 |

FOREIGN PATENT DOCUMENTS

WO 90/06618  6/1990  WIPO.

OTHER PUBLICATIONS

Elektrie 32, 1978, H.9, S.462–464, "Vergleichende Betrachtungen zur Dreh-zahl u. Stromregelung von Asynchronmaschinen mit Direktumrichtern".

Proceedings of the Industry of Applications Society Annual Meting, "AC-Cycloconverter Drives For Cold and Hot Rolling Mill Applications", Band 2.22, Sep. 1991, pp. 1134–1140.

B.R. Pelly, "Thyristor Phase-Controlled Converters and Cycloconverters", Wiley-Interscience, 1971, p. 213.

Primary Examiner—Adolf Berhane
Attorney, Agent, or Firm—Kenyon & Kenyon

[57] ABSTRACT

To improve operation when there are dynamic load requirements with a direct a.c. converter with a load connected to it in open circuit, the direct a.c. converter is controlled briefly such that the voltage vector resulting from the geometric sum of the phase voltages is increased while the phase relation remains the same.

3 Claims, 7 Drawing Sheets

DIRECT A.C. CONVERTER

BACKGROUND INFORMATION

The present invention is directed to a direct a.c. converter having three converter inputs for a three-phase power supply voltage and having converter outputs to which a three-phase load is connected. In particular, the direct a.c. converter of the present invention is connected to a motor, in open circuit, where the converter outputs are connected to each other only via the load, and a control device that controls the direct a.c. converter for setting given phase voltage characteristics in the individual load phases.

In direct a.c. converters of this type, the individual load phases of a three-phase load are connected to the converter outputs of the direct a.c. converter and are electrically insulated from each other. See B.R. Pelly, "Thyristor Phase-Controlled Converters and Cycloconverters", Wiley-Interscience (1971), p. 213. In comparison with so-called interlinked circuits, where some of the converter outputs are electrically connected at a neutral star point, this so-called open circuit offers the advantage that a simple three-phase transformer is sufficient to supply current to the direct a.c. converter because there is no direct connection of the converter outputs. On the other hand, an expensive transformer with three three-phase secondary winding systems is needed with a so-called interlinked circuit to supply the current to the direct a.c. converter with the load connected to it. See Pelly at p. 214.

Because of other disadvantages, however, direct a.c. converters with an open load circuit have not yet gained any great economic significance. With direct a.c. converters having an interlinked circuit, optimum utilization of the capacity of the transformer is usually achieved by establishing an approximately trapezoidal phase voltage characteristics for the transformer. Also, sinusoidal characteristics of the interlinked voltages under load and thus sinusoidal load currents are generated. However, with respect to direct a.c. converters having an open circuit, high in-phase harmonic currents, particularly the third harmonic, would occur if a trapezoidal phase voltage characteristic were established. Although such harmonic currents would not make any contribution to the effective output under load, they would cause an unnecessary additional burden on the direct a.c. converter. With a direct a.c. converter having an open circuit, the phase voltage is usually controlled according to a sinusoidal characteristic, but utilization of transformer capacity is relatively poor. Therefore, in order to achieve a useful power output comparable to that of a direct a.c. converter with an interlinked circuit, the voltage to be supplied by the transformer must be increased in a direct a.c. converter with an open circuit.

Nevertheless, other disadvantages arise from direct a.c. converters with an open circuit when the fastest possible current rise is required. The fastest possible current rise time is required because of load requirements related to, for example, the torque rise time of a motor. For example, if the sinusoidal phase voltage characteristic of one of the load phases is close to its amplitude, the phase voltage reaches the maximum adjustable phase voltage level at the converter outputs, i.e., the amplitude value of the voltage supplied by the transformer, and the current in the corresponding load phase rises very slowly. Then the resulting motor torque also increases with the corresponding time lag.

SUMMARY OF THE INVENTION

An object of the present invention is therefore to improve the operation of dynamic load requirements in a direct a.c. converter with a connected load in an open circuit.

The direct a.c. converter according to the present invention is characterized in that, first, only a comparatively simple transformer is needed for the power supply because the load is connected in open circuit and, second, when there are dynamic load requirements, the same voltage reserves are utilized as in direct a.c. converters with an interlinked circuit. When there are dynamic load requirements, the phase voltages at the converter outputs are adjusted independently of each other so that the voltage vector resulting from the geometric sum of the phase voltages in the vector diagram increases without any change in its instantaneous phase relation. Thus the corresponding motor currents and the motor torque also increase. To avoid amplitude and angle errors in the resulting voltage vector, it is limited such that in the vector diagram it is inside a hexagon that corresponds to the control limit of the direct a.c. converter when trapezoidal phase voltage characteristics are established.

Due to the dynamic expansion of the control limits of the three-phase system, the direct a.c. converter according to the present invention with an open circuit is particularly suitable for drives where high demands are made regarding the control dynamics, such as the drives used for a roll mill, where improved utilization of transformer and converter output and an improved power factor are achieved.

For a conventional interlinked circuit with a star point, it is true at all times that the sum of the phase currents is equal to zero. Due to reversal processes in the converter, a currentless interval must be maintained in the individual phases in current reversal, i.e., with each pass of the current through zero. Since the sum of the phase currents is zero even at this time, this means that the current vector resulting from the geometric sum of the actual values of the phase currents is almost stationary. This results in a control deviation from the setpoint values of the phase currents. This deviation must be corrected after the currentless interval is finished. Consequently, the revolution of the current vector is not continuous, thus resulting in ripple in the torque characteristic of the motor.

With an open circuit, the sum of the phase currents is not necessarily zero. Here again, a currentless interval must be maintained at zero current in the individual phases, but the currents in the two other phases can be adjusted freely. Within the scope of the present invention, the setpoints of the freely adjustable phase currents are corrected so the resulting current vector of the actual values of the phase currents is not stationary, but instead continues steadily and at a constant angular velocity. This prevents ripple in the motor torque curve.

DETAILED DESCRIPTION

Figure 1:
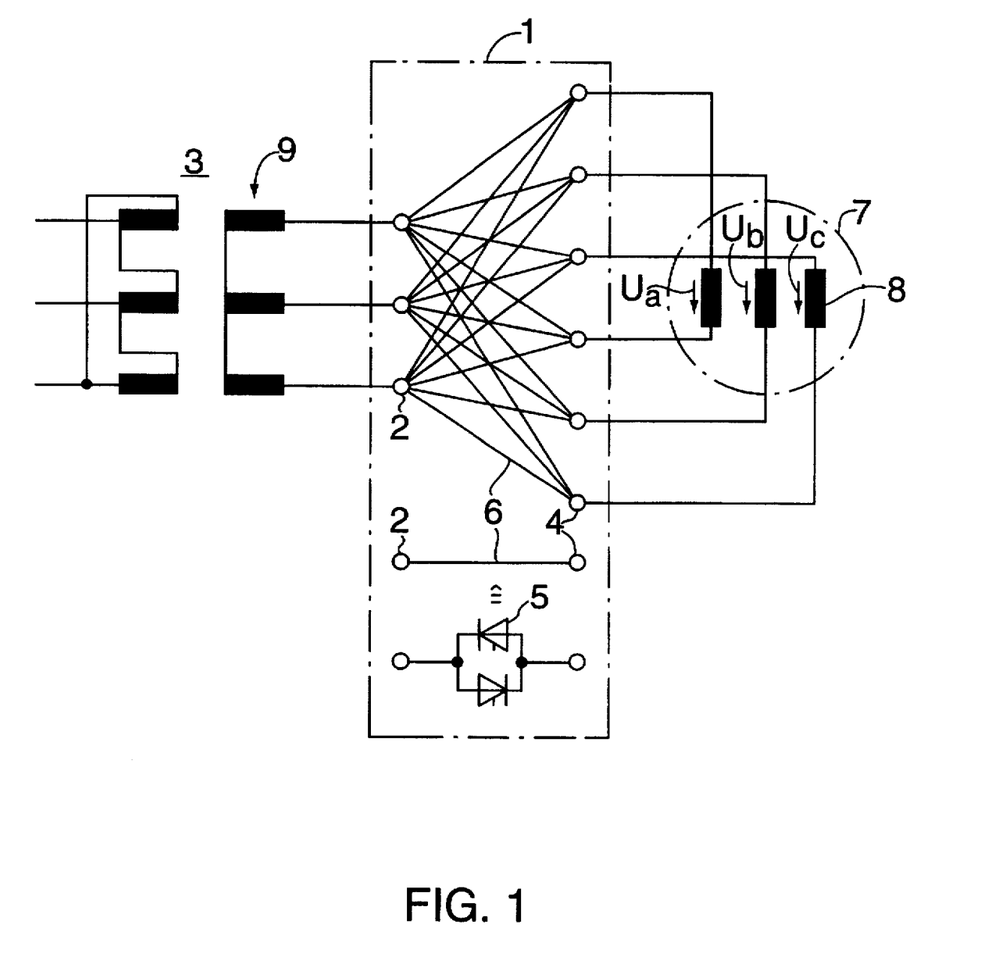
FIG. 1 shows a direct a.c. converter with a three-phase load in open circuit in accordance with the present invention.

FIG. 1 shows a direct a.c. converter 1 connected to a three-phase transformer 3 at three converter inputs 2. Direct a.c. converter 1 has six converter outputs 4, where each converter output 4 is connected to each converter input 2 across valve branch 6 formed by two antiparallel thyristors 5. A three-phase load 7, namely a motor here, is connected in open circuit to converter outputs 4, where each load phase 8 is connected to two converter outputs 4 without any converter outputs 4 being electrically linked together to form a star point. This makes it possible for transformer 3 to have only a single three-phase secondary winding system 9. With a so-called interlinked circuit of the load phases, i.e., a circuit with a star point, however, a separate secondary winding system of the transformer would be necessary for the power supply of each individual load phase.

Figure 2:
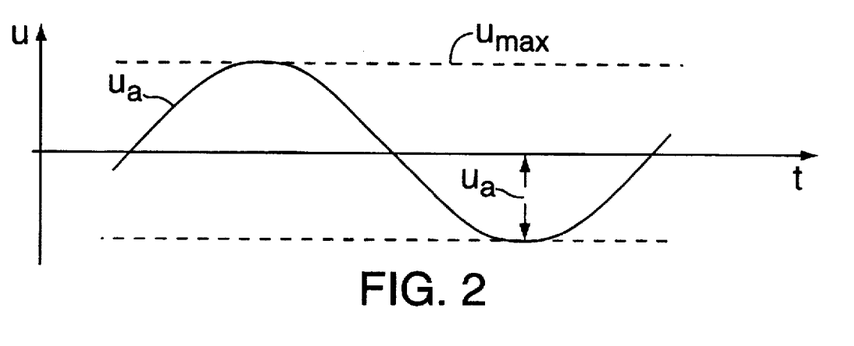
FIGS. 2 to 4 show diagrams with the phase voltage characteristics in the individual load phases with sinusoidal control and trapezoidal control.

Direct a.c. converter 1 with an open circuit is triggered with a sinusoidal voltage control in steady-state operation, so a sinusoidal phase voltage characteristic is generated in each load phase 8, assuming an infinite pulse number. FIG. 2 shows the sinusoidal phase voltage characteristic curve $u_a$ in one of the load phases 8. Due to the sinusoidal voltage control, load 7 does not have any in-phase harmonic currents, in particular the third harmonic, that would cause an unnecessary burden on the direct a.c. converter 1 and would not contribute toward an increase in the useful power output in load 7. As FIG. 2 shows, phase voltage $u_a$, on reaching its amplitude value $U_a$, reaches the maximum adjustable phase voltage value $U_{max}$ which corresponds to the amplitude value of the voltage supplied by transformer 3. If the fastest possible current rise in load phases 8 is required at this time due to the load requirements due to, for example a rapid increase in the torque of motor 7, then the phase voltage near the maximum adjustable phase voltage value $U_{max}$ cannot contribute to it. Therefore, the current can only build up slowly in the respective load phase 8. As a consequence, the resulting torque in motor 7 also increases with a corresponding time lag.

Figure 3:
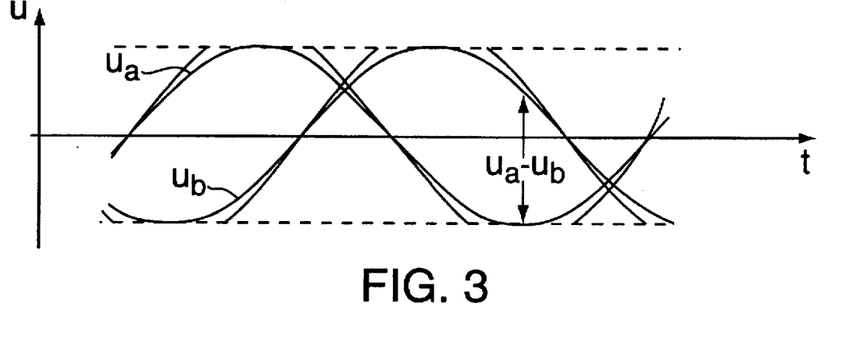

As FIG. 3 shows, in a direct a.c. converter with an interlinked circuit and a sinusoidal voltage control, there are some definite reserves for increasing the interlinked voltage $u_a-u_b$ that are utilized by a voltage control with a rounded trapezoidal form. In such direct a.c. converters, this type of trapezoidal voltage control is usually also accomplished in steady-state operation because the resulting interlinked voltage assumes a sinusoidal characteristic.

Figure 4:
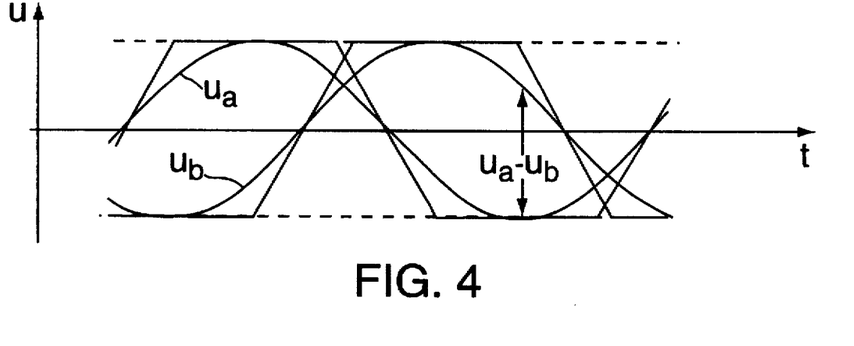

As FIG. 4, shows, with respect to a direct a.c. converter with an interlinked circuit under a sinusoidal voltage control, the interlinked voltage $u_a-u_b$ obtained from such sinusoidal voltage control could be increased even further by an angular trapezoidal voltage control, but then the resulting interlinked voltage would be trapezoidal rather than sinusoidal.

Figure 5:
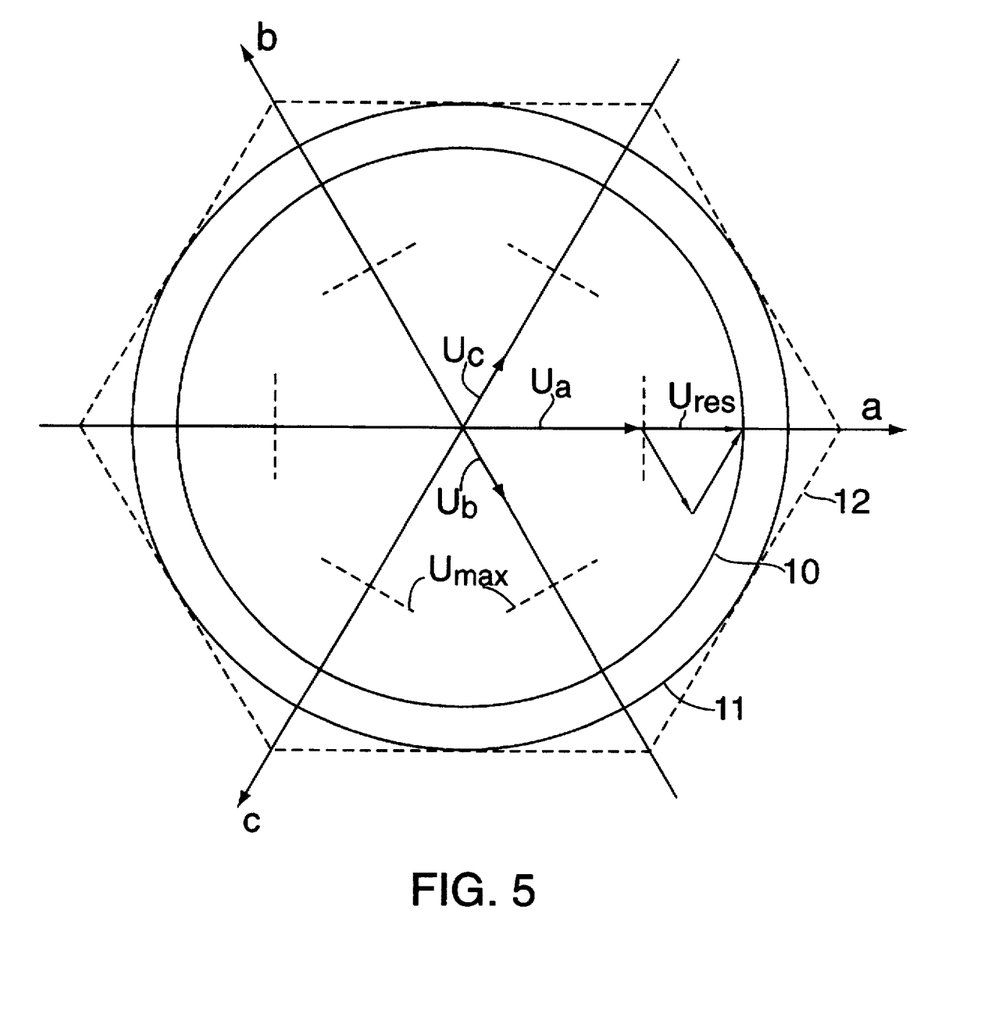
FIG. 5 shows a vector diagram of the phase voltages with the control limits of the direct a.c. converter.

FIG. 5 shows a vector diagram for phase voltages $u_a$, $u_b$ and $u_c$ in the individual load phases 8 of load 7, which is connected to direct a.c. converter 1 in open circuit. The 120°-staggered axes of the phase voltages are designated as a, b and c accordingly. The limits of the maximum adjustable phase voltage $U_{max}$ are indicated at each of the axes a, b and c. The geometric sum of phase voltages $u_a$, $u_b$ and $u_c$ yields a resulting voltage vector $U_{res}$. A locus diagram of $U_{res}$ is formed by the inner circle 10 around the intersection of the three axes a, b and c with sinusoidal voltage control according to FIG. 2. The resulting voltage vector $U_{res}$ illustrated in FIG. 5 is obtained when phase voltage $u_a$ has reached its positive amplitude corresponding to voltage limit $U_{max}$ and the two other phase voltages $u_b$ and $U_c$ each have half their negative amplitude. Outer circle 11 indicates the locus diagram of the resulting voltage vector $U_{res}$ when the rounded trapezoidal form illustrated in FIG. 3 is established for phase voltages $u_a$, $u_b$ and $u_c$. When phase voltages $u_a$, $u_b$ and $u_c$ are controlled according to the angular trapezoidal curve illustrated in FIG. 4, the resulting voltage vector $U_{res}$ has a hexagonal locus diagram 12.

Figure 6:
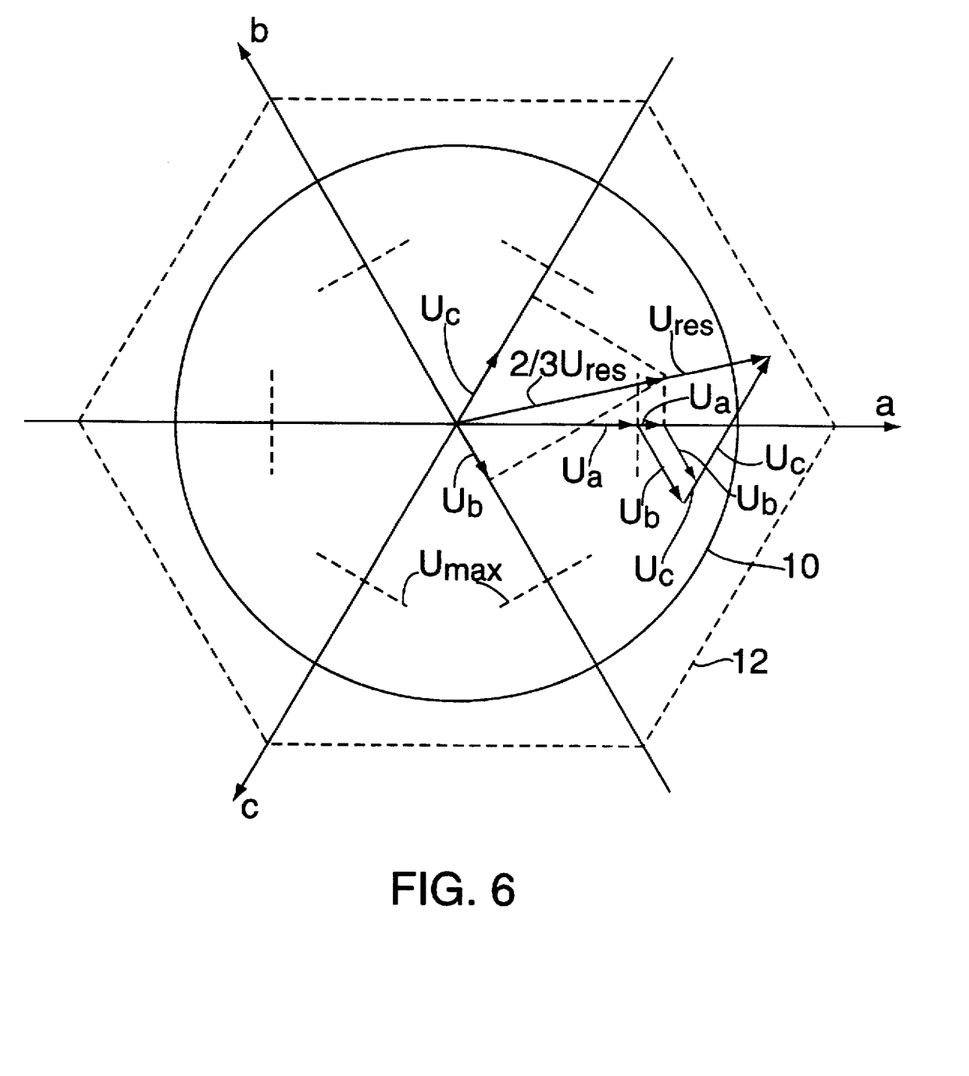
FIG. 6 shows a vector diagram of the phase voltages with an example of generating an enlarged resulting voltage vector in dynamic load requirements.

As FIG. 6 shows, in the case of dynamic load requirements, phase voltages $u_a$, $u_b$ and $u_c$ at converter outputs 4 of the direct a.c. converter illustrated in FIG. 1 are temporarily adjusted independently of each other such that the resulting voltage vector $U_{res}$ in the vector diagram increases beyond the limit of the locus diagram 10 for the sinusoidal voltage control without any change in its instantaneous phase relation. To do so, the values $u_a'$, $u_b'$ and $u_c'$ are first determined from the given setpoint voltage vector $U_{res}$ for the three phase voltages that correspond to the projections of the setpoint voltage vector $U_{res}$ multiplied by two-thirds onto the three axes a, b and c of the phase voltages in the vector diagram. If one of the $u_a'$, $u_b'$ or $u_c'$ values, namely the $u_a'$ value in the present case, exceeds the maximum adjustable phase voltage $U_{max}$ by an amount d, the respective $u_a'$ value is limited to the maximum phase voltage value $U_{max}$, where the $u_b'$ and $u_c'$ values are increased at the same time by the same amount d for the two other phase voltages. Thus, $u_a = U_{max}$, $u_b = u_b' + d$ and $u_c = u_c' + d$. The phase voltages at converter outputs 4 are set at the resulting values $u_a$, $u_b$ and $u_c$, resulting in voltage vector $U_{res}$.

Figure 7:
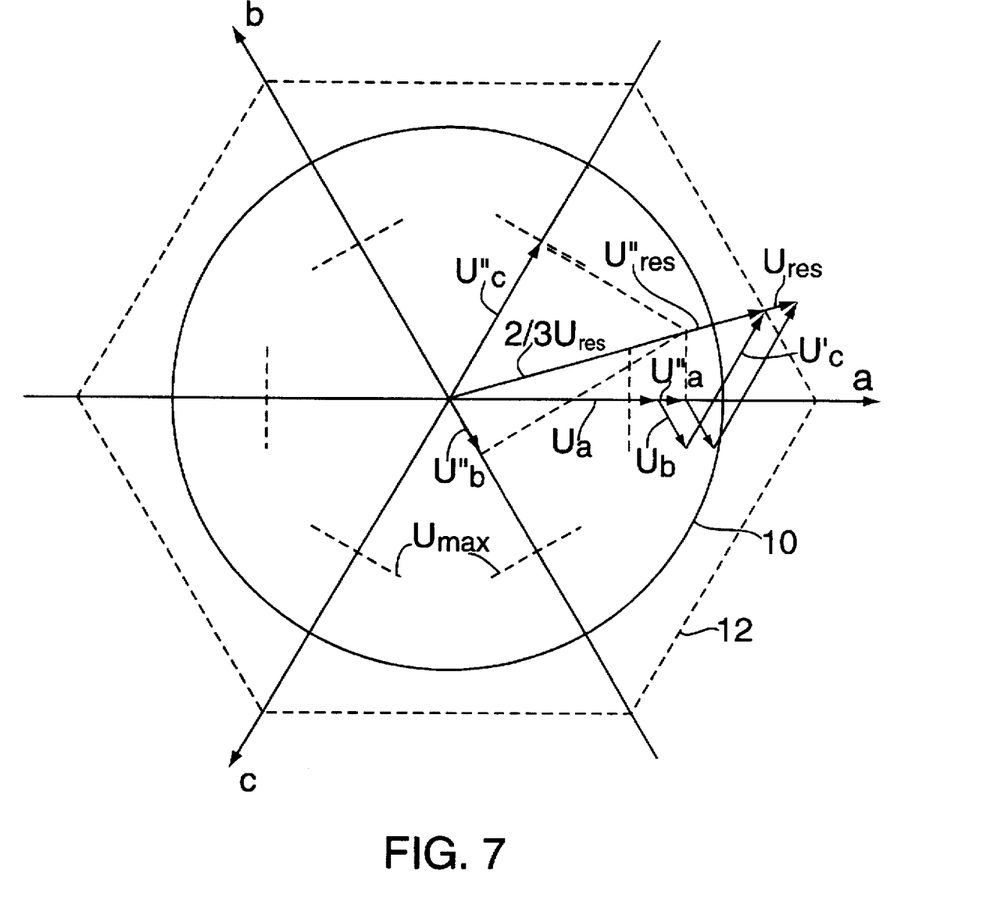
FIG. 7 shows a vector diagram of the phase voltages with an example of limiting the resulting voltage vector.

As long as the setpoint voltage vector $U_{res}$ is inside the hexagonal locus diagram 12, it can be set above phase voltages $u_a$, $u_b$ and $u_c$ within the limits defined by the maximum adjustable phase voltage value $U_{max}$. If, as illustrated in FIG. 7, a setpoint voltage vector $U_{res}$ that exceeds the hexagonal locus diagram 12 is set by the control, then it must be limited to values along hexagonal locus diagram 12 to avoid amplitude and angle errors. At first, $u_a''$, $u_b''$ and $u_c''$ values are determined for the three phase voltages which correspond to the projections of setpoint voltage vector $U_{res}$ multiplied by two-thirds onto the three axes a, b and c of the vector diagram, as explained with reference to FIG. 6. Then all the $u_a''$, $u_b''$ and $u_c''$ values are reduced proportionally by the same factor, where the $u_a'$, $u_b'$ and $u_c'$ values are given. Then the following limit is obtained for phase a, for example:

$$u_a'/U_{max} = \pm(4/3)/(1+(1/3)\cdot abs((u_b''-u_c'')/u_a'')).$$

When one of the resulting $u_a'$, $u_b'$ and $u_c'$ values exceeds the maximum adjustable phase voltage $U_{max}$, the $u_a'$, $u_b'$ and $u_c'$ values are thus corrected in the same way as described on the example of FIG. 6.

Figure 8:
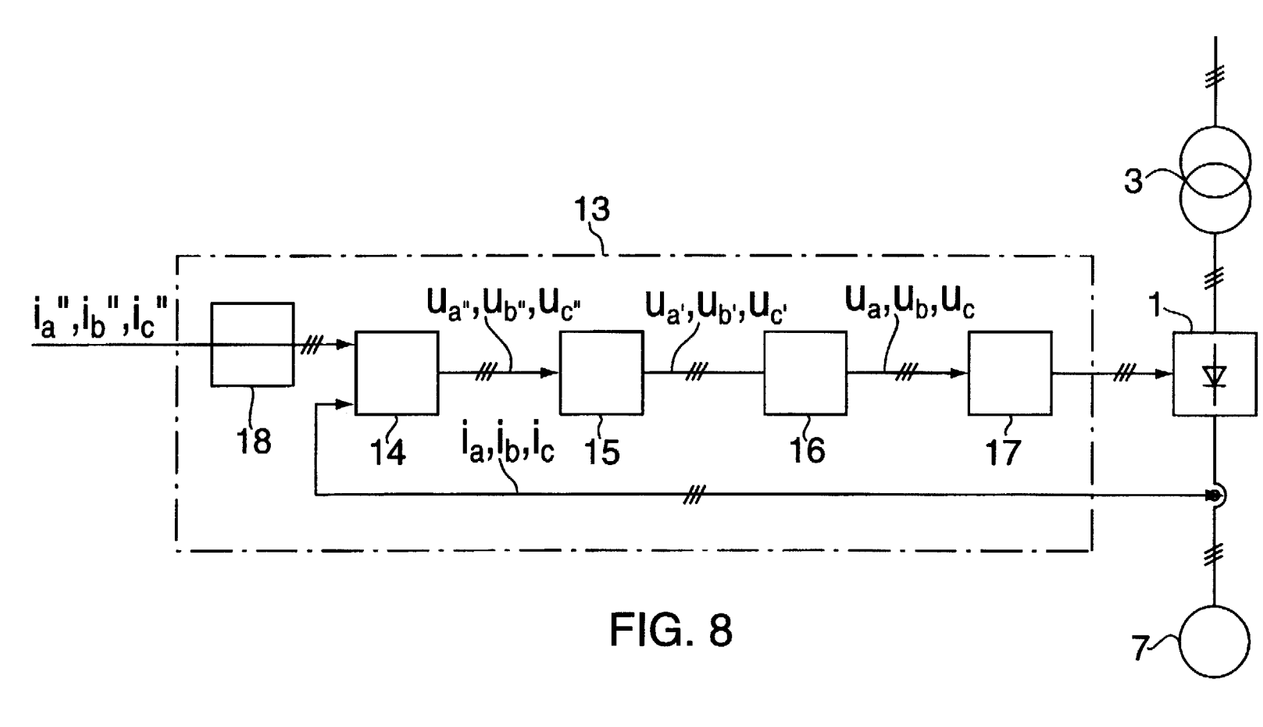
FIG. 8 shows an example of a control device for controlling the direct a.c. converter of the present invention.

FIG. 8 shows an example of a control device 13 for controlling direct a.c. converter 1, which is shown here in a simplified diagram with transformer 3 and motor 7 connected to direct a.c. converter 1 in open circuit. Control device 13 contains a current regulator 14 that determines the $u_a''$, $u_b''$ and $u_c''$ values for the phase voltages having a sinusoidal curve in steady-state operation of direct a.c.

converter 1 as a function of the control deviations between setpoints $i_a^*$, $i_b^*$ and $i_c^*$ and actual values $i_a$, $i_b$ and $i_c$ of the motor currents. With dynamic load requirements, these values are briefly controlled such that the setpoint voltage vector resulting from the geometric sum of these values is increased with no change in phase relation. The $u_a''$, $u_b''$ and $u_c''$ values are limited to the $u_a'$, $u_b'$ and $u_c'$ values in circuit block 15 in accordance with the process steps illustrated in conjunction with FIG. 7 such that the resulting setpoint voltage vector comes to lie within hexagonal control limit 12. The $u_a'$, $u_b'$ and $u_c'$ values are corrected to the values $u_a$, $u_b$ and $u_c$ in the next circuit block 16 according to the process steps explained in conjunction with FIG. 6 and are then transferred to a control set 17 for controlling direct a.c. converter 1.

If one of the phase voltages is limited to the maximum adjustable phase voltage $U_{max}$, as illustrated in FIG. 6 for phase voltage $u_a$, it may happen that the control difference at the input of current regulator 14 cannot be corrected between setpoint $i_a^*$ and actual value $i_a$ of the respective phase current because of the limit to phase voltage $u_a$. In this case, setpoint values $i_b^*$ and $i_c^*$ of the two other phase currents are increased by the amount of control difference $i_a^* - i_a$ to prevent counter-regulation of current regulator 14.

As mentioned above, phase voltages $u_a$, $u_b$ and $u_c$ are controlled in steady-state operation of direct a.c. converter 1 so as to have a sinusoidal characteristic. The current is regulated in current regulator 14 such that $i_a + i_b + i_c = 0$. This condition does not hold during operation under dynamic load requirements as described above and a zero system is allowed for the phase currents.

Figure 9:
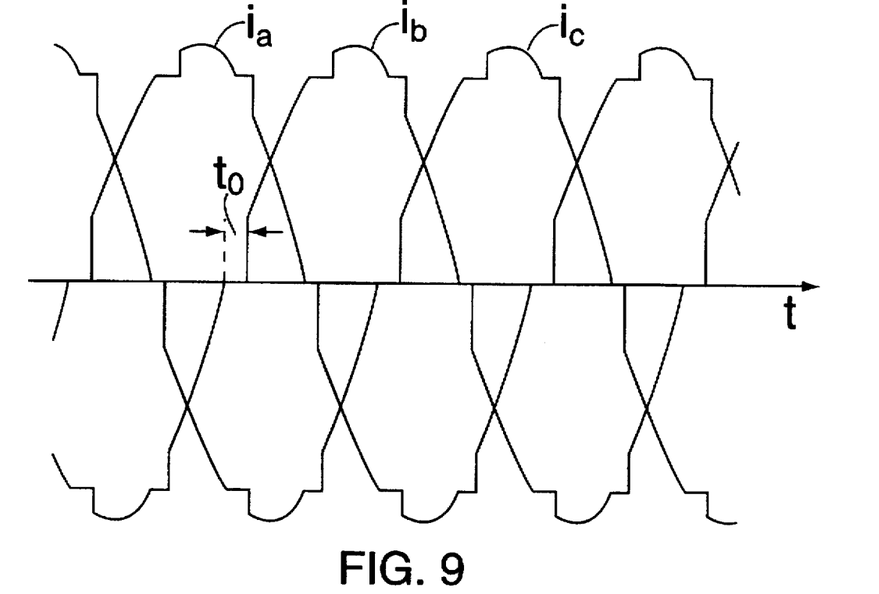
FIG. 9 shows an example of the phase current characteristics with a converter having a conventional interlinked circuit.

FIG. 9 shows the basic curves for phase currents $i_a$, $i_b$ and $i_c$ in a conventional interlinked circuit with a star point where the condition $i_a + i_b + i_c = 0$ holds at all times. Due to switching processes taking place in the converter, a currentless interval to must be maintained in each individual phase when the current is reversed, i.e., at the zero crossing of the current wave. The condition $i_a + i_b + i_c = 0$ holds even at this time. Consequently, the current vector resulting from the geometric sum of phase currents $i_a$, $i_b$ and $i_c$ almost comes to a standstill. Since the corresponding current vector of setpoints $i_a^*$, $i_b^*$ and $i_c^*$ continues to run, this results in a control deviation that must be corrected at the end of currentless interval $t_0$, but the transition curves are not shown here. Therefore, the revolution of the current vector is not steady and there are ripples in the torque curve of the converter-driven motor.

Figure 10:
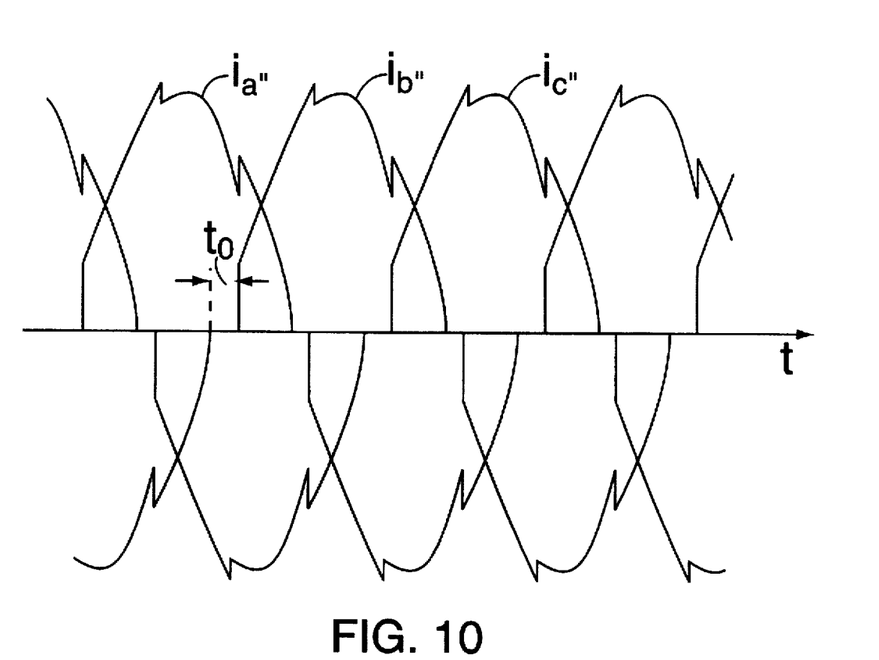
FIG. 10 shows an example of the phase characteristics with a direct a.c. converter according to the present invention with an open circuit.

In contrast with FIG. 9, FIG. 10 shows the curve of the setpoints of phase currents $i_a^*$, $i_b^*$ and $i_c^*$ in an open direct a.c. converter circuit as illustrated in FIG. 1. Here again, a currentless interval to must be maintained with each zero crossing of the current wave, but the condition $i_a + i_b + i_c = 0$ does not hold for dynamic processes, as mentioned above. Therefore, setpoints $i_a^*$, $i_b^*$ and $i_c^*$ are corrected during currentless interval to such that the angular velocity resulting from the geometric sum of actual values $i_a$, $i_b$ and $i_c$ continues to run. For this reason, setpoints $i_a^*$, $i_b^*$ and $i_c^*$ are precontrolled accordingly during currentless interval $t_0$ so the ripple in the torque curve of motor 7 is reduced. This precontrol takes place in a corrector device 18 (shown with dotted lines in FIG. 8).

What is claimed is:

1. A direct a.c. converter comprising:
   a plurality of converter inputs for connection to a three-phase power supply voltage;
   a plurality of converter outputs for connection to a three-phase load having a plurality of load phases; and
   a control device for setting a plurality of phase voltage characteristics, each one of the plurality of phase voltage characteristics corresponding to one of the plurality of load phases, wherein an effective voltage vector results from a geometric addition of the plurality of voltage characteristics corresponding to the plurality of load phases, wherein, when dynamic load requirements are present, the control device triggers the direct converter such that the value of each of the phase voltage characteristics increases in comparison with the value of the phase voltages resulting from a sinusoidal phase voltage characteristic, wherein the effective voltage vector resulting from the geometric sum of the phase voltage characteristics increases in comparison with the effective voltage vector that results from the sinusoidal phase voltage characteristic, and wherein a harmonic with a frequency equal to three times a fundamental frequency of the three-phase load develops in load currents of the plurality of load phases when the phase voltage characteristics increase beyond a predetermined amount in comparison with the phase voltage resulting from the sinusoidal phase voltage characteristic.

2. The direct a.c. converter according to claim 1, wherein the control device sets the phase voltage characteristics according to a trapezoidal curve over time in order to develop a plurality of harmonics, each one of the harmonics corresponding to one of the load currents at a frequency equal to three times the fundamental frequency of the three-phase load.

3. The direct a.c. converter according to claim 2, wherein the control device suppresses the harmonics in the three load currents after the dynamic load requirements decrease.

* * * * *